US006980792B2

(12) United States Patent
Iivonen et al.

(10) Patent No.: US 6,980,792 B2
(45) Date of Patent: Dec. 27, 2005

(54) BILLING FOR REPLIES IN A COMMUNICATION SYSTEM

(75) Inventors: Jukka-Pekka Iivonen, Helsinki (FI); Ari-Pekka Simonen, Jyväskylä (FI)

(73) Assignee: Nokia Corporation, Espoo (FI)

(*) Notice: Subject to any disclaimer, the term of this patent is extended or adjusted under 35 U.S.C. 154(b) by 154 days.

(21) Appl. No.: 10/301,860

(22) Filed: Nov. 22, 2002

(65) Prior Publication Data

US 2003/0114140 A1 Jun. 19, 2003

Related U.S. Application Data

(63) Continuation of application No. PCT/FI01/00512, filed on May 29, 2001.

(30) Foreign Application Priority Data

May 30, 2000 (FI) ............................................ 20001294

(51) Int. Cl.[7] ....................... H04M 11/00; H04M 15/00; H04M 1/64

(52) U.S. Cl. ................. 455/406; 379/88.18; 379/88.23; 379/88.26; 379/114.05; 379/114.2; 379/209.1

(58) Field of Search .............................. 455/31.1, 31.2, 455/31.3, 412, 414, 466, 552, 553, 556, 557; 379/67.1, 88.11, 88.12, 88.13, 88.18, 88.19, 88.22, 88.23, 88.25, 88.26

(56) References Cited

U.S. PATENT DOCUMENTS 5,740,229 A * 4/1998 Hanson et al. ............. 379/67.1
5,864,606 A * 1/1999 Hanson et al. ........... 379/88.18
6,069,890 A * 5/2000 White et al. ................ 370/352
6,078,820 A * 6/2000 Wells et al. ................ 455/466
6,122,485 A * 9/2000 Archer ....................... 340/7.22
6,125,281 A * 9/2000 Wells et al. ................ 455/466
6,215,858 B1 * 4/2001 Bartholomew et al. .. 379/88.17
6,285,745 B1 * 9/2001 Bartholomew et al. .. 379/88.17

FOREIGN PATENT DOCUMENTS

| | | |
|---|---|---|
| EP | 0 753 957 | 1/1997 |
| EP | 0 833 490 | 4/1998 |
| FI | 992461 | 11/2000 |
| WO | WO 98/09451 | 3/1998 |
| WO | WO 98/56202 | 12/1998 |
| WO | WO 00/41415 | 7/2000 |
| WO | WO 01/37537 | 5/2001 |

* cited by examiner

*Primary Examiner*—Binh Tieu

(57) ABSTRACT

The invention relates to a method, a telecommunications system, a message server and terminal equipment enabling that the sender of a message can be billed for a reply to the message. In the method of the invention, an indication is added to a first message, indicating that the sender of the first message is billed for a reply to the first message, the message containing the first indication is transmitted (506) to the receiver, and when the receiver replies to the message, a second indication is added to the reply of the receiver, containing at least a part of the first indication, and on the basis of the second indication, the sender of the first message is billed (516) for the reply.

14 Claims, 4 Drawing Sheets

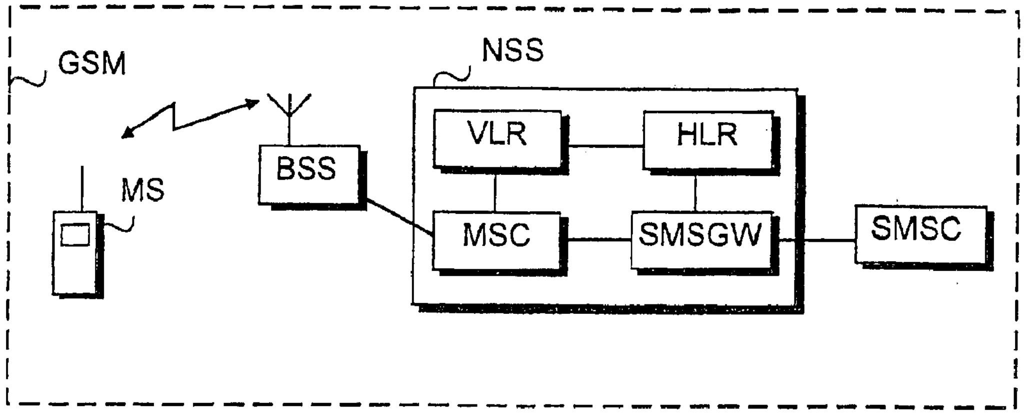
FIG.1
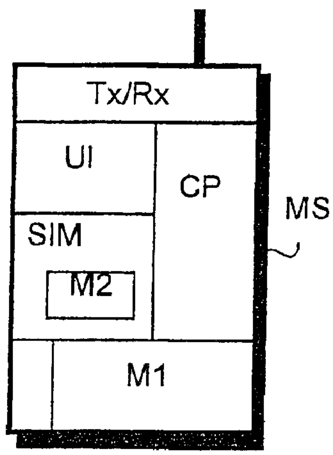
FIG.2
FIG.3
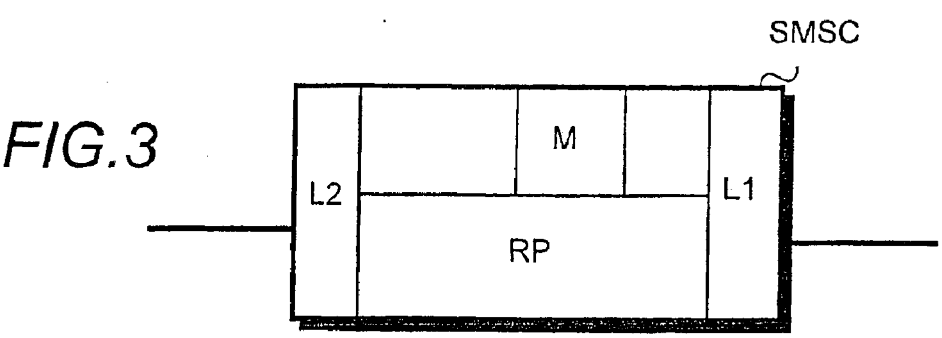
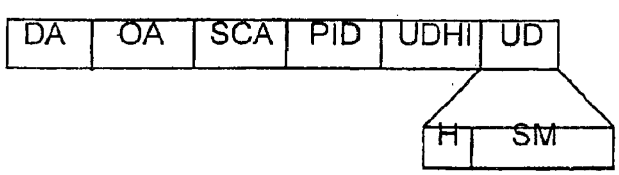
FIG.4

BILLING FOR REPLIES IN A COMMUNICATION SYSTEM

This application is a Continuation of International Application PCT/FI01/00512 filed May 29, 2001 which designated the U.S. and was published under PCT Article 21(2) in English.

BACKGROUND OF THE INVENTION

The invention relates to billing for replying to a message in a communication system. The invention relates especially to billing for replying to a message transmitted in a mobile system.

A mobile system generally refers to any telecommunications system enabling wireless communication while users are moving within the service area of the system. A typical mobile system is the public land mobile network (PLMN).

The services offered through telecommunications systems, especially mobile systems, improve continuously. Especially the number of services provided through various messages to subscribers have continuously increased. In addition to text-only short messages, services comprising multimedia messages are also provided today. These various message services have in common that they use servers added to the system. Short messages, for instance, are always transmitted through a short message service centre and WAP (wireless application protocol) multimedia messages are always transmitted through a WAP server.

Message services are implemented in such a manner that the sender of a message is always billed for the message he sends. There are, however, situations where the person who transmitted the original message would like that a reply to the message was billed to the sender of the original message. This is, however, not possible with prior art message services.

BRIEF DESCRIPTION OF THE INVENTION

It is thus an object of the invention to develop a method and an apparatus implementing the method so as to solve the above problem. The object of the invention is achieved by a method, a system, a message server and a mobile station characterized by what is stated in the independent claims. Preferred embodiments of the invention are disclosed in the dependent claims.

The invention is based on the idea that when the sender of the original message wants to pay for the reply to said message, a related indication is attached to the original message. This indication is transmitted with the message to the receiver and when the receiver replies to the message, the indication is attached to the reply. This way, the reply contains information stating that the sender of the reply is not to be billed for the reply. The content of the indication is invisible to the end-user. The invention provides the advantage that a sender can transmit messages and have the replies to the messages billed to himself. Various enquiries, for instance, can be made by messages without costs arising to the person replying to them.

BRIEF DESCRIPTION OF THE FIGURES

In the following, the invention will be described in greater detail by means of preferred embodiments and with reference to the attached drawings in which FIG. 1 illustrates the network architecture of the GSM system, FIG. 2 shows a block diagram of a mobile station, FIG. 3 shows a block diagram of a message server, FIG. 4 shows basic elements of a short message.

DETAILED DESCRIPTION OF THE INVENTION

Figure 5:
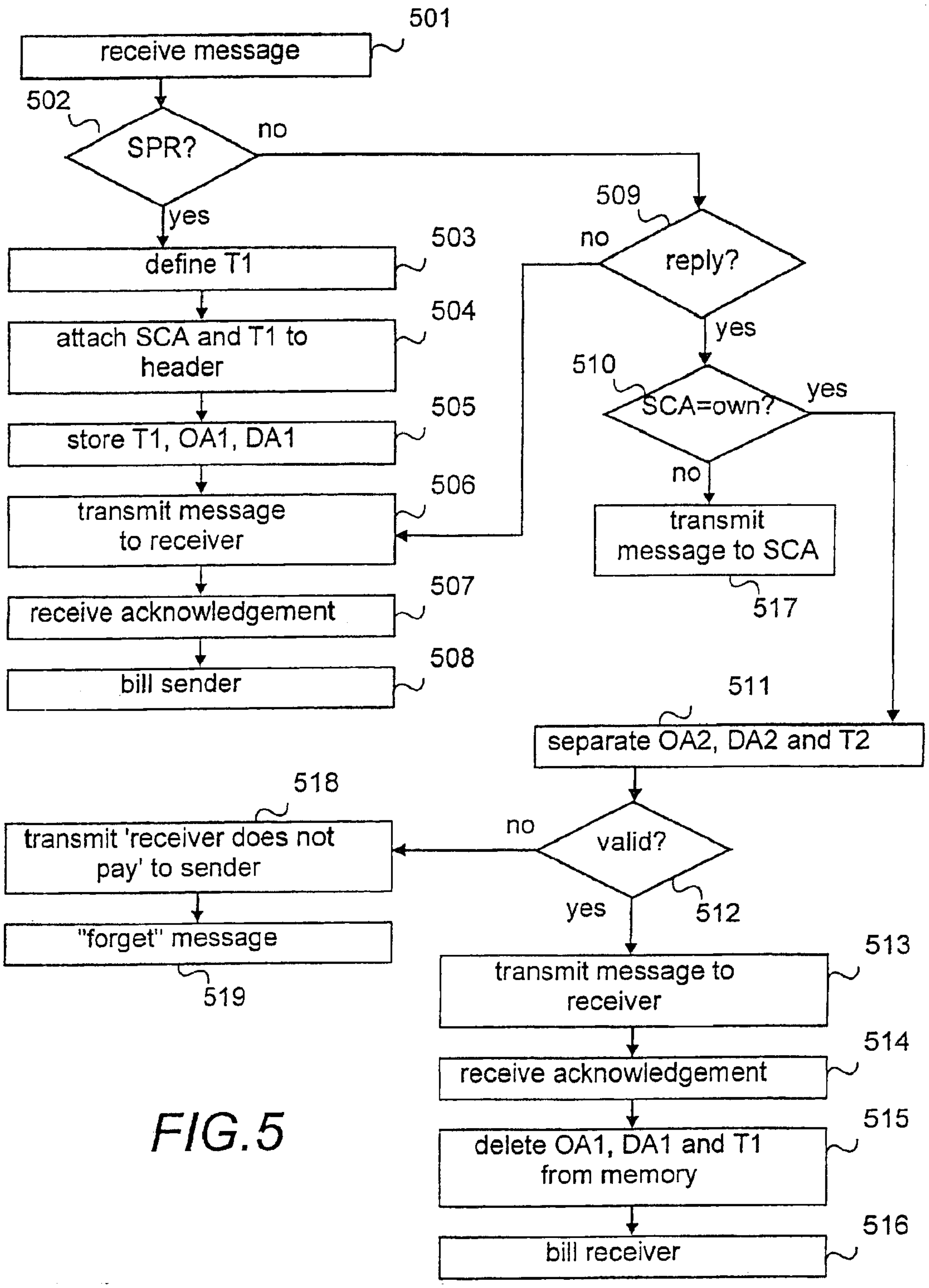
FIG. 5 shows a flow chart of the operation of a first preferred embodiment of the invention in a short message service centre.

The present invention can be applied to any communication system in which message-based services are provided in such a manner that the transmitted message always goes through a message server. Such systems include the GSM system (Global System for Mobile Communications), its next generation, GSM 2+, and corresponding systems, such as PCS (Personal Communication System), DCS 1800 (Digital Cellular System for 1800 MHz) and TETRA (Trans-European Trunked Radio). The invention can also be applied to third-generation mobile systems, such as UMTS (Universal Mobile Telecommunications System) and IS-41 (Interim Standard). Examples of message-based services are short messages and WAP (Wireless Application Protocol) services. The messages transmitted in a message service can be text messages or multimedia messages. A multimedia message usually comprises parts having different kinds of content, for example MIME coded entities. The parts can be GIF (graphical interchange format) coded pictures, MPEG (motion picture experts group) coded moving pictures and coded voice. In the following, the invention is described using the GSM system and the short message service as examples without, however, limiting the invention to a certain system or message service.

FIG. 1 is a general description of the network architecture of the GSM system, since a more detailed structure of the system bears no essential significance to the invention. The actual network only transfers messages between the mobile station and the message server.

The structure of a network GSM according to the GSM system 1 comprises two parts: a base station subsystem BSS and a network subsystem NSS. BSS and mobile stations MS communicate by means of radio connections. A mobile station of the invention is described in greater detail in connection with FIG. 2. The base station subsystem is connected to a mobile switching centre MSC of the network subsystem NSS. The task of the mobile switching centre is to connect calls with at least one mobile station MS. Some mobile switching centres are connected to other telecommunications networks, such as the public switched telephone network PSTN, and they contain switching functions for connecting calls to and from these networks. These mobile switching centres are called gateway switching centres. In a short message service, the mobile switching centre MSC transmits the short message it has received on to a mobile station MS or to a short message service centre SMSC.

The network subsystem NSS comprises databases of two types. Subscriber information for all subscribers in the network are stored permanently or semi-permanently in a home location register HLR in such a manner that the subscriber information is combined with the subscriber identity IMSI. The second type of register is a visitor location register VLR. When a mobile station MS is active (it is attached to the network and can make or receive calls), a major part of the subscriber information related to the mobile station MS in the home location register HLR is loaded (copied) into the visitor location register of the mobile switching centre in whose area the mobile station MS is. The home and visitor location registers are used for routing short messages in a mobile network in essentially the same manner as for routing calls.

For a short message service, the system comprises at least one short message service centre SMSC and a short message service gateway SMSGW. The short message service centre SMSC is described in greater detail later in connection with FIG. 3. In this application, the short message service centre represents all different message servers. The short message service gateway SMSGW is a common title for a switching centre transmitting short messages to mobile stations SMS-GMSC (gateway mobile switching centre for short message service) and a switching centre transmitting short messages from mobile stations SMS-IWMSC (interworking mobile switching centre for short message service). SMS-GMSC receives a short message from a short message service centre SMSC, requests routing information from a home location register HLR and delivers the short message through a mobile switching centre MSC to a mobile station MS. Correspondingly, SMS-IWMSC receives short messages from a mobile station for forwarding to a short message service centre SMSC.

FIG. 2 is a block diagram of a mobile station MS of the invention. In this context, mobile station MS refers generally to an entity formed by a mobile subscriber and actual terminal equipment. The subscriber is identified by a subscriber identity module SIM which is detachably attached to the terminal equipment. It is a smart card located in a mobile station, which contains information related to identifying the subscriber, such as an individual identity number of the mobile subscriber IMSI. SIM comprises a memory M2, a part of which is allocated for storing short messages.

The actual terminal equipment can be any terminal equipment or combination of equipment capable of communicating in a mobile system, for instance a multimedia computer with a Nokia card phone connected to it to provide a mobile connection. The terminal equipment comprises a transceiver Tx/Rx including its antennas, a user interface UI, a controller CP and a memory M1, a certain part of which is allocated for storing short messages. The memory of a mobile station thus comprises two parts, the memory of the terminal equipment M1 and the SIM card memory M2.

The user interface UI usually comprises a keyboard, a display unit, a loudspeaker and a microphone, which are not shown in FIG. 2. By means of the user interface UI, the subscriber can write, send, read, delete and edit short messages and give other instructions to the controller CP.

The controller CP receives input, such as that related to short messages, from the user interface. The controller CP can indicate with a tone, a message on the display or a symbol to the user of the mobile station that a short message has arrived for the subscriber. The controller CP can also through the user interface produce for the user of the mobile station sound signals, textual instructions or help symbols related to the operation of the mobile station and/or system. The controller also receives and transmits short messages through the transceiver Tx/Rx.

Figure 6:
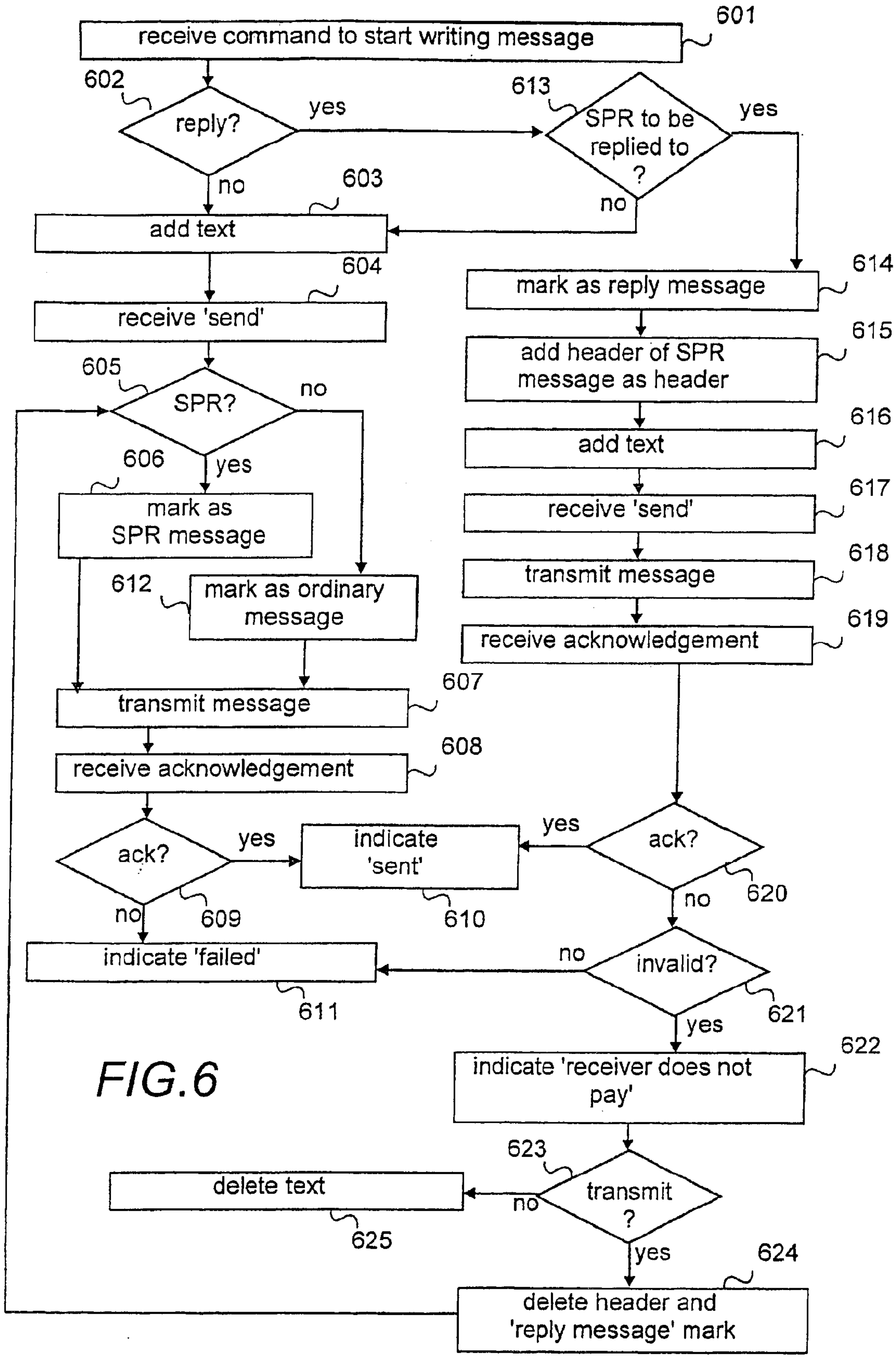
FIGS. 6 and 7 show flow charts of the operation of a first preferred embodiment of the invention in a mobile station.
Figure 7:
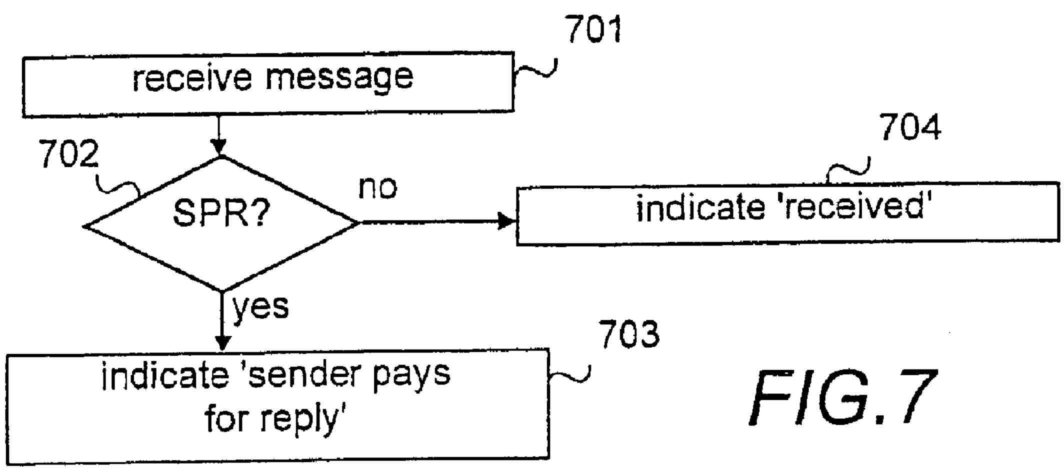

A mobile station of the invention is, depending on the embodiment, adapted to perform all or a part of the functions shown in FIGS. 5 to 7. All alterations required for the implementation of the invention can be executed as added or updated software routines and/or with application circuits (ASIC). Some of the alterations can be made in the controller CP and some in the SIM card. It is also possible to make the alterations only in the controller.

FIG. 3 shows a block diagram of a short message service centre SMSC of the invention, which forwards short messages, and stores and retransmits those not delivered. All short messages are transmitted through a short message service centre. A short message service centre can receive a short message through any network for delivery to a mobile station, and a short message written using a keyboard from a mobile station for onward delivery to another mobile station or another destination. A short message service centre can also receive a short message for a mobile station directly from a short message entity connected to a short message service centre. Where and how the short message is created bears no significance to the invention. It should be emphasized, however, that the short message service centre is only one example of a message server of the invention. The short message service (and the corresponding network nodes) thus represent all possible message-based services (and servers) in this figure.

The short message service centre SMSC comprises an interface part L1 for receiving and transmitting short messages through the short message service gateway SMSGW from and to the mobile station in the mobile system. The short message service centre SMSC may comprise interface parts L2 (only one drawn in the figure) for connecting the short message service centre to other networks, such as PSTN, and/or to servers connected directly to a short message service centre. These interface parts are used to transmit and receive short messages or other messages, such as e-mail, from which short messages are created or which are made from short messages in the corresponding interface parts L1, L2. In addition, the short message service centre comprises a transmission part RP which transmits the short message received by the short message service centre SMSC for onward delivery. The transmission part RP also stores into its memory M any short messages which could not be delivered and retrieves the messages according to instructions when the delivery can be made.

The transmission part RP of the short message service centre SMSC of the invention performs all or part of the short message service centre functions described in FIGS. 5 and 6, depending on the embodiment. All alterations required for implementing the invention can be executed as added or updated software routines, and/or with application circuits (ASIC). Additional memory may also be needed in the short message service centre (message server).

FIG. 4 shows basic elements of a short message of the GSM system ending at a mobile station to the extent that the elements can be used for implementing the invention in the first preferred embodiment. The basic elements may be nested inside each other, their order may differ from what is shown in the figure and their names from what are stated here. The essential thing is that the information contained in the elements is transmitted.

The basic element destination address DA shows the address of the receiver. The basic element originating address OA shows the address of the sender, and the basic element service centre address SCA shows the address of the short message service centre the sender is using. The basic element protocol identifier PID either refers to the higher-level protocol used or indicates switching to a certain type of telematic service. The basic element user data header indicator UDHI indicates whether the basic element user data UD contains a header. The UD field contains the actual short message SM. In addition, it may contain a separate header H. The header H may be used to indicate a 'reply paid' message of the invention. In addition, the header H may contain an identifier for checking that the message can be billed to the receiver. The basic element PID of a short message can also be used for corresponding purposes. In addition, the information in the basic element PID can be combined with the information in the header H. The billing key required for billing for a reply can be formed with these basic elements.

In the first preferred embodiment of the invention, the basic element PID indicates the type of the message. The message can be a prior art-type message, or a message replying to which is paid by the sender of the message, or a reply message paid by the receiver. In the following, a message replying to which is paid by the sender of the message is referred to as an SPR message. The basic elements DA and OA are used to check that the receiver of the reply message will pay for the reply himself. The identifier added to the header H is used for the same purpose. In the first preferred embodiment of the invention, the billing key is formed by the identifier in the header and the basic elements DA and OA. In the first preferred embodiment of the invention, the address SCA of the short message service centre used by the sender is added to the header H for the purpose of finding the short message service centre containing the billing key. The short message service centre used by the sender of the reply is not necessarily the same as that used by the sender of the SPR message.

FIG. 5 shows the operation of a short message service centre in the first preferred embodiment of the invention. In the first preferred embodiment of the invention, it is assumed for clarity's sake that one SPR message only allows for one reply message billed to the sender of the SPR message. It is further assumed that the SPR message is not a broadcast message, but addressed to one receiver. It is also assumed that a message transmitted on from the short message centre is also delivered. The delivery of the message and what is done if a message cannot be delivered are performed according to prior art and do not bear any significance to the invention. They are, therefore, not described herein.

In FIG. 5, step 501, a short message is received and in step 502, a check is made to see whether the message is an SPR message. In the first preferred embodiment, this is checked from the PID value of the message. If the message is an SPR message, an identifier T1 is defined for it in step 503. At its simplest, the identifier T1 is a serial number used to number the messages transmitted by the requester and which is reset to zero at certain intervals. In step 504, a short message service centre address SCA and the identifier T1 is added to the message, more precisely to its header in the first preferred embodiment of the invention. Then in step 505, the originating address OA1, destination address DA1 and identifier T1 are stored in the memory as a billing key, and in step 506, the message is transmitted to the receiver according to prior art. In step 507, an acknowledgement indicating that the message was successfully delivered to the receiver is received. After this, the sender of the message is billed for the short message in step 508.

If the message is not an SPR message, a check is made in step 509 to see whether the message is a reply message. In the first preferred embodiment, this is checked from the PID value of the message. If the message is a reply message, a check is made in step 510 to see whether the short message service centre address SCA in the header of the reply message is the same as the address of the short message service centre itself. If the address is the same, the short message service centre has information on whether an SPR message has been transmitted and been replied to. If the short message service centre address is the same (step 510), the destination address DA2 and originating address OA2 of the message and the identifier T2 from the header of the message are separated in step 511, and in step 512, a check is made to see whether the billing key formed by the identifier, destination address and address of the sender is valid. In the first preferred embodiment of the invention, the billing key is valid if a billing key whose OA1 is the same as DA2, DA1 is the same as OA2 and T1 is the same as T2, can be found in the memory of the short message service centre. If the billing key is valid (step 512), the message is transmitted to the receiver according to prior art in step 513. In step 514, an acknowledgement on a successful delivery to the receiver is received. After this, in step 515, the billing key, i.e. OA1, DA1 and T1, is deleted from the memory for instance by marking the memory space reserved by the billing key as free. This ensures that only one reply message is billed to the sender of the SPR message. At the same time, the receiver of the message is billed for the short message in step 516. In other words, the sender of the SPR message is billed for the reply message to the SPR message.

If the short message service centre address SCA in the header of the reply message is not the same as the short message service centre's own address (step 510), the reply message is transmitted as such in step 517 to the short message service centre of the receiver, i.e. to the address SCA in the header of the reply message. This forwarding is not billed.

If the billing key is not valid (step 512), information is sent in step 518 to the sender of the reply message that charging the reply to the sender of the SPR message cannot be done. In other words, in the first preferred embodiment of the invention, information is sent that the receiver will not pay for the short message. After this, in step 519, the short message service centre "forgets" the reply message, i.e. does not forward it or store it in the memory to wait for forwarding in the first preferred embodiment of the invention.

In a preferred embodiment of the invention, it is possible to define how many replies can be sent to an SPR message so that they are billed to the sender of the SPR message. The definition can be made by the operator, or the user of the mobile station can indicate the number of replies in the SPR message, in which case the number of replies is in the short message settings of the mobile station or the sender of the short message provides it when sending the SPR message. This defined number of replies is stored in the memory of a short message service centre at least when the SPR message contains such a number. In this embodiment, the routine moves from step 514 to step 516, after which the number of replies maintained in the short message centre is updated. After the update, a check is made to see if the number of replies is the same as the defined number of replies, and if it is, the billing key is deleted from the memory. Checking the number of replies can also be made in connection with checking the validity of the billing key (step 512).

In a preferred embodiment of the invention, it is possible to define a reply time during which the sender of the SPR message pays for the reply. This reply time can be defined by the operator, or the user of the mobile station can indicate the time in the SPR message, in which case the time is either in the short message settings or the sender of the short message provides it when sending the SPR message. In this embodiment, in addition to the billing key (step 505), the reply time is stored in step 512 at least when the sender of the SPR message provides it. The remaining reply time is checked at the same time as the validity of the billing key (512). In addition, the short message server may comprise a background process, for instance, which at certain intervals checks the reply time remaining for the billing keys and deletes the billing keys (with reply times) whose reply time has expired.

In a preferred embodiment of the invention, the billing key is not deleted from the memory in step 515, but marked as used (and, thus, invalid).

In a preferred embodiment of the invention, the subscriber information in the home location register contains information on the short message service centre through which the subscriber transmits SPR messages. In this embodiment, the short message service centre only adds to the header the identifier T1 (step 504) and requests the short message service centre address of the receiver from the home location register after it has found the message to be a reply message (step 509). In other words, it requests the address of the short message service centre through which the SPR message was transmitted, to which this message replies. After receiving the short message service centre address, the short message service centre checks if it is the same as its own address (step 510).

In a preferred embodiment of the invention, the short message service centre does not transmit the reply message to the short message service centre of the SPR message (steps 510 and 517), but asks from the short message service centre of the SPR message if the billing key is valid by sending the billing key to the short message service centre of the SPR message. If the billing key is valid, the short message service centre bills the receiver (step 516) by sending a bill to the short message service centre of the SPR message.

FIG. 6 shows the operation of a mobile station in the first preferred embodiment of the invention when a short message is sent from the mobile station. In this description, the mobile station represents all different message entities, i.e. terminal equipment, with which an end-user can transmit messages to mobile stations or other terminal equipment, by means of which the receiver can read the messages.

In FIG. 6, the mobile station receives in step 601 from the user of the mobile station a command to start writing a short message. In step 602, a check is made to see whether the start command is a reply to a received short message, in other words, whether the short message to be transmitted is a reply. If the short message to be transmitted is not a reply, a text written by the user of the mobile station through the user interface is added to the short message in step 603. When a 'send' command is received from the user of the mobile station (step 604), a check is made in step 605 to see if the message is an SPR message. In the first preferred embodiment of the invention, this is done by asking the user of the mobile station through the user interface if he wants to pay for the reply to this message. If the short message to be transmitted is an SPR message, the message is marked as one in step 606. In the first preferred embodiment of the invention, this is done by setting the PID parameter value of the message to correspond to a PID parameter value indicating an SPR message. After this, in step 607, the short message is transmitted and an acknowledgement on its delivery is received in step 608. If the acknowledgement is positive 'ack' (step 609), the user of the mobile station is advised that the short message has been transmitted. If the acknowledgement is not 'ack' (step 609), the user of the mobile station is advised that the delivery of the short message has failed.

If the message is not an SPR message (step 605), the short message is marked as an ordinary message in step 612 and the routine moves to step 607 to transmit the short message. In the first preferred embodiment of the invention, the message is marked as an ordinary message by setting the PID value of the message according to prior art. An ordinary message refers here to all short message types other than SPR messages and reply messages to SPR messages.

If the short message to be transmitted is a reply (step 602), a check is made in step 613 to see whether the message to be replied to is an SPR message. In the first preferred embodiment of the invention, this can be found out from the PID parameter of the message to be replied to. If the message to be replied to is not an SPR message, the routine moves to step 603 to add text to the short message.

If the message to be replied to is an SPR message (step 613), the message which will now be written and transmitted is marked as a reply message in step 614. In other words, in the first preferred embodiment of the invention, the PID parameter of the message is set to a parameter value indicating a reply message. After this, in step 615, the header of the SPR message to be replied to is added as the header of the reply message. In step 616, the text written by the user of the mobile station through the user interface is added to the short message. After receiving (step 617) a send command from the user of the mobile station, the short message is transmitted in step 618 and an acknowledgement on the delivery of the short message is received in step 619. If the acknowledgement is positive 'ack' (step 620), the user of the mobile station is advised in step 610 that the short message has been transmitted.

If the acknowledgement is not 'ack' (step 620), a check is made in step 621 to see if the reason for a negative acknowledgement is that the billing key is not valid. If the billing key is not valid, the user is advised in step 622 that the receiver will not pay for this short message, and the user is asked in step 623 whether this short message should be transmitted despite this. If the short message is transmitted, the header and the marking 'reply message' is deleted in step 624 from the short message, after which the routine moves to step 605 to check if this is an SPR message. If the short message is not transmitted (step 623), the text written by the user is deleted in step 625 and the routine continues according to prior art.

In FIG. 6, there is no mention of adding the destination address (i.e. the address of the receiver of the message) and the originating address (i.e. that of the sender of the message) to the short message. This is done according to prior art: the destination address for a reply message is the originating address of the message to be replied to, and for other messages, the destination address is requested from the user of the mobile station and the originating address is the telephone number of the mobile station.

In a preferred embodiment of the invention, a reply message which the sender wants to transmit even though it cannot be billed to the receiver, is marked as an ordinary message and transmitted. In other words, the routine moves from step 624 directly to step 612.

In a preferred embodiment of the invention, it is possible to define in the short message settings of the mobile station whether the messages (other than reply messages) are transmitted as SPR messages. In this embodiment, the message setting marking the message as an SPR message or not is checked in step 605.

In a preferred embodiment of the invention, the user of a mobile station can use at least two different send commands, i.e. 'send as an SPR message' and 'send'. If the message is a reply message, the mobile station transmits the short message as a reply message, even though the user selects 'send as an SPR message'. In other messages, the selection controls whether the message is marked as an SPR message or not. In this embodiment, a check is made in step 605 to see whether the user gave a 'send as an SPR message' command.

In a preferred embodiment of the invention, a reply message is always transmitted from the mobile station to the short message service centre through which the SPR message arrived. In this embodiment, the header of the SPR message does not have the SCA address, i.e. the short message service centre only adds the identifier T1 to the header (FIG. 5, step 504). In this embodiment, between steps 617 and 618, the SCA element value is fetched from the SPR message and used as the short message service centre address instead of the short message service centre address in the short message settings of the mobile station. In this embodiment, the short message service centre does not perform steps 510 and 517 of FIG. 5.

Even though not stated above, the SPR messages and reply messages can also have other message properties in that they can be messages that delete the previous message, for instance.

FIG. 7 shows the operation of a mobile station in the first preferred embodiment of the invention when the mobile station receives a short message. The mobile station receives a short message in step 701 and checks in step 702 if the received message is an SPR message. If the message is an SPR message, the mobile station advises the user in step 703 that a short message whose reply is paid by the sender of the message, has arrived at the mobile station. The billing key is, however, never entirely revealed to the receiver. In other words, the billing key is invisible to the end-user. If the message is not an SPR message, the mobile station indicates in step 704 that it has received a short message.

In a preferred embodiment of the invention, the mobile station indicates that the reply is billed to the sender of the received message when the user of the mobile station reads the short message.

In a preferred embodiment of the invention, the free of charge nature of the received message is not indicated to the receiver of an SPR message.

The steps described above in FIGS. 5, 6 and 7 are not in an absolutely chronological order, and some of them can be performed simultaneously or differing from the given order. Other functions can also be performed between the steps. Some of the steps can be left out, such as steps 621 to 625 in an embodiment where the failure of transmitting a message is not specified (i.e. the fact that the reply message was not delivered because the billing key was not valid, is not indicated).

The embodiments presented above or parts of them can be combined to produce preferred embodiments of the invention.

It should be emphasized that the above is only one example of a billing key and of how SPR messages and reply messages are marked. A new record invisible to the end-user can also be added to the message, to indicate the type of the message (an SPR message, reply message, or other). If the message is an SPR message, the short message service centre adds a billing key or a part of it to the record. Correspondingly, the record of a reply message contains a billing key or a part of it. A billing key can be formed in any way as long as the SPR message to be billed and thus the subscriber to be billed can be identified reliably enough with it. The billing key can, for instance, be formed by a method used for coding electronic money of the identifier of the SPR message sender and a random number.

Even though in the above, the invention has been explained by means of short messages, it is, however, not limited solely to them, but it is obvious to a person skilled in the art how to apply the invention to other message services, such as WAP messages or other multimedia messages.

Even though in the above, the invention has been explained assuming that a message is replied to with a similar message, the invention is not limited to this alternative. A short message can be replied to with a WAP message, for instance. If the short message service centre cannot transmit WAP messages, the functionality of the invention can be implemented in such a manner, for instance, that the WAP server asks the short message service centre if the billing key is valid by transmitting the billing key included in the WAP message to the short message service centre. If the key is valid, the WAP server transmits the message on, after which it preferably sends the billing information to the short message service centre. It is also possible that an SPR message is replied to with a call. Information is then added to the call set-up signalling indicating that this is a reply call which is billed to the receiver. The switching centre responsible for setting up the call then performs steps 509 to 516 described in FIG. 5 as applicable. In other words, the switching centre controlling the call set-up identifies the call as a reply, checks the validity of the billing key and bills the receiver. At its simplest, this can be implemented as an intelligent network-like service. The intelligent network-like service uses the control principles of the intelligent network wherein a node transmitting a call, session or packet data contacts a control function of a service which gives the node instructions affecting the transmission of the call, session or packet data. Making a contact from said node to the control function of a service is based on the node's triggering data on the service. The contact can also be an event notification when the instructions are not waited for.

Even though it is assumed in the above that the receiver of the reply is the sender of the SPR message, the invention can also be applied to situations where the reply goes to a third party. In embodiments of this kind, there is a field in the SPR message, which indicates the address to which the sender of the SPR message is willing pay a reply. This address can be a part of the billing key.

It is to be understood that the above description and the related figures are only intended to illustrate the present invention. It will be obvious to a person skilled in the art that the invention may be implemented in a variety of alternative ways without departing from the scope and spirit of the invention disclosed in the attached claims.

What is claimed is:

1. A method for billing a sender of a message for a reply to the message, the method comprising:

creating a first message;

adding to the first message a first indication indicating at least to a message transmitting system that a sender of the first message is billed for a reply message to the first message;

giving a time limit to the first indication, the time limit indicating how long the first indication is valid;

transmitting the first message containing the first indication to a receiver; and when the receiver replies by reply message to the first message:

adding a second indication to the reply message, the second indication containing at least a part of the first indication and indicating to the message transmitting system that this reply message is a reply to the first message;

checking, in response to the second indication, whether the first indication is still valid; and billing the sender of the first message for the reply message on the basis of the second indication only if the first indication is still valid.

2. The method of claim 1, further comprising:

receiving the first message in a message server transmitting messages;

generating an identifier in the message server;

adding the identifier to the first indication;

transmitting the message containing the first indication from the message server to the receiver;

storing into the message server a first billing key with the time limit, the first billing key comprising at least the identifier; and including into the second indication at least the identifier in the first indication; and using the first billing key when checking whether or not the first indication is valid.

3. The method of claim 2, further comprising:

forming a second billing key using at least the identifier in the second indication;

checking prior to transmitting the reply message to the receiver of the reply message whether a valid first billing key corresponding to the second billing key can be found in the message server; and only if a valid first billing key is found:

transmitting the reply message to the receiver of the reply message; and billing the sender of the first message for the reply message.

4. A communication system comprising at least one message server for transmitting a first message from a sender to a receiver; and at least two terminal equipment for transmitting a first message and answering to it, the terminal equipments being arranged to add to the first message and to a reply message to the first message an indication indicating to the message server that the sender of the first message is billed for the reply message to the first message; wherein the message server is further arranged to identify the first message, to generate an identifier, to add the identifier to the indication prior to transmitting the first message to the receiver, to store a first billing key comprising at least the identifier at most for a predefined time and after the predefined time has expired, to change the first billing key to invalid, to separate a second billing key comprising at least the identifier from the reply message, to check prior to transmitting the reply message to the receiver if the first billing key corresponding to the second billing key is valid, and only in response to a valid first billing key to transmit the reply message to the receiver and to bill the sender of the first message for the reply message.

5. The communication system of claim 4, wherein the message server is further arranged in response to an invalid first billing key to transmit to the terminal equipment of the sender of the reply message the reason why the reply message will not be delivered to the receiver; and the terminal equipment is further arranged in response to receiving the reason to indicate the reason to the user of the terminal equipment and in response to an instruction received from the user to transmit the reply message without the indication.

6. A message server for transmitting messages from a sender to a receiver, the message server comprising memory and being arranged to identify a first message in response to an indication in the first message, the indication indicating that the sender of the first message will be billed for a reply message to the first message, to generate an identifier in response to the first message, to add the identifier to the indication in the first message prior to transmitting the first message to the receiver, to store into memory a first billing key comprising at least the identifier at most for a predefined time and after the predefined time has expired, to change the first billing key to invalid, in response to a reply message to the first message to check if the first billing key indicated in the reply message is valid, and only in response to a valid first billing key to transmit the reply message to the receiver and to bill the sender of the first message for the reply message.

7. The message server of claim 6, further being arranged to maintain a count of reply messages sent to the first message, to compare the count to predefined information on how many reply messages can be sent to the first message in such a manner that the sender of the first message is billed for the reply messages, and in response to the count equalling the predefined information, to change the first billing key to invalid.

8. Terminal equipment arranged to transmit messages to a telecommunications system, wherein the terminal equipment is arranged to add to a message an indication with a time limit, the indication indicating that the sender of the message pays for a reply message to the message if the reply message is sent within the given time limit.

9. The terminal equipment of claim 8, further being arranged to add the indication with the time limit to the message in response to a setting in the terminal equipment.

10. The terminal equipment of claim 8, further being arranged to add the indication with the time limit to the message in response to an instruction provided by the user of the terminal equipment through the user interface of the terminal equipment.

11. The terminal equipment of claim 8, wherein the terminal equipment is a mobile station.

12. Terminal equipment arranged to receive messages from a telecommunications system and to reply to them by messages, wherein the terminal equipment is arranged to identify a received message as a first message, whose reply message will be paid for by a sender of the first message, from a first indication in the first message, and to add to a reply message to the first message a second indication which indicates that the reply message is a reply to the first message and which second indication contains at least a part of the first indication, to receive information that the telecommunications system was unable to deliver the reply message in such a manner that the sender of the first message was billed for the reply message and, in response to the information, to transmit the reply message without the second indication.

13. The terminal equipment of claim 12, wherein the terminal equipment is a mobile station.

14. A communication system comprising at least one message server for transmitting a first message from a sender to a receiver; and at least two terminal equipment for transmitting a first message and answering to it by a message, the terminal equipments being arranged to add to the first message and to a reply message to the first message an indication indicating to the message server that the sender of the first message is billed for the reply message to the first message and to add to the first message a time limit indicating the time how long the indication is valid; wherein the message server is arranged to identify the reply message, to check whether or not the indication is still valid, and to bill the sender of the first message for the reply message only if the indication is still valid.

* * * * *